United States Patent [19]

Hill

[11] 3,761,825

[45] Sept. 25, 1973

[54] MULTIPATH SIMULATOR FOR MODULATED R.F. CARRIER SIGNALS

[75] Inventor: Eugene R. Hill, Thousand Oaks, Calif.

[73] Assignee: The United States of America as represented by the Secretary of the Navy, Washington, D.C.

[22] Filed: June 14, 1972

[21] Appl. No.: 280,615

[52] U.S. Cl. .......................... 328/71, 35/10.4, 325/67, 328/155, 328/158, 343/17.7

[51] Int. Cl. .......................... H03k 17/02, G01s 9/00

[58] Field of Search ..........328/55-56, 69, 71, 142, 328/143, 155, 158, 159, 188; 332/20, 23 R, 23 A; 35/10.4; 325/67; 343/7.7, 17.7

[56] References Cited

UNITED STATES PATENTS

| | | | |
|---|---|---|---|
| 3,293,552 | 12/1966 | Sichak | 328/56 |
| 3,332,078 | 7/1967 | Conrad | 35/10.4 X |
| 3,500,407 | 4/1970 | Thompson | 35/10.4 X |
| 3,573,339 | 4/1971 | Flower et al. | 35/10.4 |

*Primary Examiner*—Stanley D. Miller, Jr.
*Attorney*—Richard S. Sciascia et al.

[57] ABSTRACT

A multipath simulator which delays a baseband signal and then translates this delay to the modulated RF signal. This is done by producing a difference signal which is the difference between the delayed and undelayed baseband signals. The undelayed baseband signal first modulates the RF carrier directly. This modulated RF carrier is then divided into two branches. The difference signal is then used to modify the modulation on one of these branches to make it appear as if it had been modulated by the delayed baseband signal. The linear sum of these two RF signals is a signal which simulates the effects of multipath on modulated RF carrier signals.

16 Claims, 12 Drawing Figures

MULTIPATH SIMULATOR FOR MODULATED R.F. CARRIER SIGNALS

BACKGROUND OF THE INVENTION

This invention relates to circuits for producing simulated signals and more particularly relates to a circuit for simulating the effects of multipath on a modulated RF signal.

The loss of telemetry data due to multipath distortion and cancellation of signals has been a serious problem for a long time. The seriousness of the problem has been compounded in recent years by the conversion from VHF to UHF and the increased use of airborne receiving stations. Investigations of the multipath phenomena heretofore relied on expensive flight tests and expensive laboratory simulation equipment with limited capability. Equipment developed to cope with this problem has fallen short of desired expectations under field conditions. As a result a great need exists for versatile techniques for realistically simulating multipath signals in the laboratory.

In the past, multipath signals have been simulated by delaying the RF carrier signal by means of RF delay lines or acoustic delay lines. Delays produced in this manner tend to be fixed and are not easily varied. Usually lumped constant delays are provided in the form of cascaded elements which are switched to achieve the desired delay. This arrangement of delay devices becomes increasingly cumbersome and expensive, especially when long delays are desired. These delays are usually achieved at RF frequencies which involve problems inherent at RF. It would be more desirable to provide multipath simulation at baseband frequencies. The present invention provides just such a solution to the problems inherent in delays achieved at RF frequencies.

SUMMARY OF THE INVENTION

The purpose of the present invention is to provide a more efficient and flexible approach to multipath simulation techniques.

This invention provides multipath simulation by generating a modulated direct path signal and an identically modulated indirect path signal which is delayed with respect to the direct path. The requisite delay on the indirect path signal is produced by modulating it with a composite signal which represents the difference between the direct and indirect signals as will be more fully explained hereinafter. The present invention is advantageous in that multipath effects on the modulated carrier signal can be simulated by delay of the baseband signals rather than the RF carrier as in the past. In addition, simple video circuitry can be used in place of the expensive and bulky equipment involved in wideband RF delay devices and large, continuously variable delays are relatively easy to achieve at baseband. An important feature of this invention is in the use of RF phase and frequency modulators in conjunction with control signals to produce the effect of delaying a modulated RF signal. Furthermore, many alternative implementations of the basic ideas are possible depending upon the modulation of the RF carrier and the types of modulators employed. For example, circuits have been designed for frequency, phase and amplitude modulated RF carriers respectively.

It is an object of the present invention to simulate the effects of multipath on modulated RF carrier signals.

Another object of the present invention is to provide multipath simulation at baseband frequencies.

Yet another object of the present invention is to provide multipath simulation without the need for bulky and expensive equipment.

Still another object of the present invention is to provide multipath simulation in which large continuously variable delays are relatively easy to achieve.

A still further object of the present invention is to provide multipath simulation adaptable to frequency, phase or amplitude modulated RF carriers.

Other objects, advantages and novel features of the invention will become apparent from the following detailed description of the invention when considered in conjunction with the accompanying drawings in which like reference numerals refer to like parts.

DETAILED DESCRIPTION OF THE PREFERRED EMBODIMENT

Figure 1:
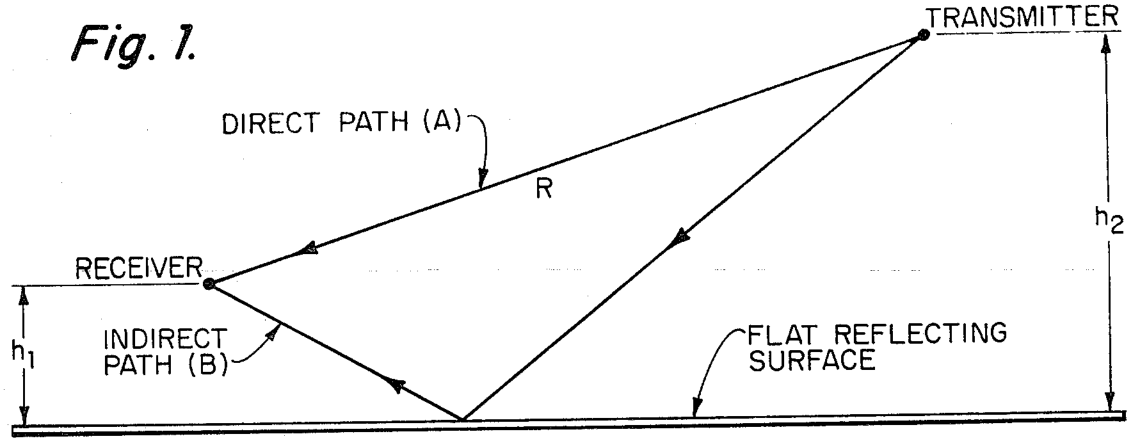
FIG. 1 illustrates the simple multipath condition.

The basic multipath signal simulator is designed to simulate the received signal for a multipath situation consisting of a direct and an indirect path. The simple multipath situation is illustrated in FIG. 1 which consists of a direct path signal A, an indirect path signal B, and a flat reflecting surface. The critical parameters are the differential time delay (hereinafter designated $\tau$) between the two paths and the magnitude of B relative to A. The time delay $\tau$ is a function of the height of the receiver $h_1$ and the transmitter $h_2$ above the reflecting surface and of the range R between the receiver and transmitter.

The magnitude of B with respect to A is primarily a function of $\tau$, the polarization of the signal and the characteristics of the reflecting surface. The relationships between the A and B signals and the resultant C are best shown in the vector diagram of FIG. 2. For an unmodulated carrier with angular frequency $\omega_c$ the phase of the B vector relative to the A vector is proportional to $\tau$.

$$\Phi_o = \omega_c \tau \quad (1)$$

Where $\Phi_o$ is the average phase angle of B relative to A (Equation (1) does not include the fixed phase shift which may occur at the reflecting surface).

In the absence of modulation and differential doppler, $\Phi_0$ will remain constant since the frequencies of the A and B signals are always equal. Multipath distortion arises when modulation is applied because the time delay $\tau$ causes instantaneous frequency differences between the A and B signals.

Figure 3:
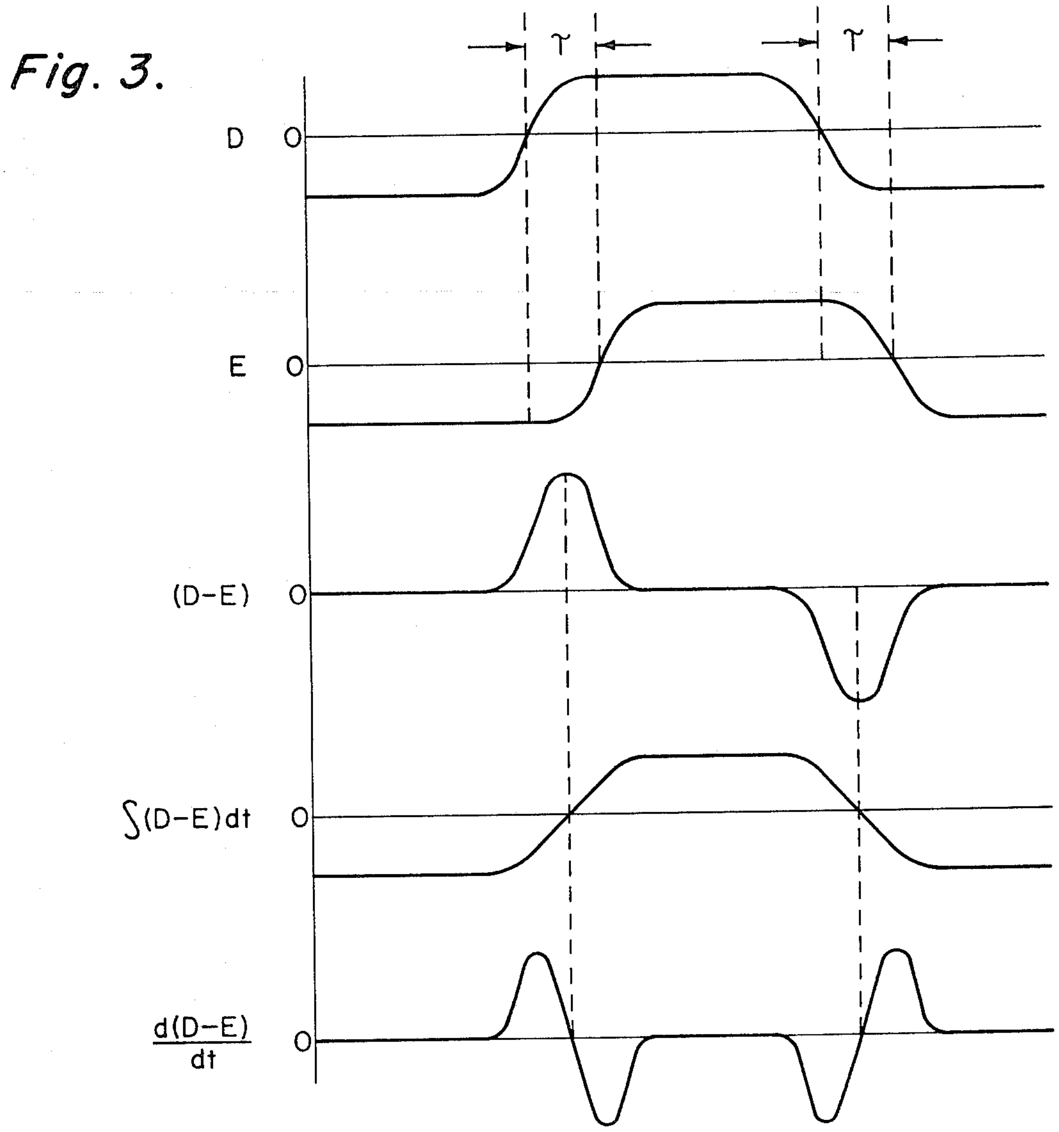
FIG. 3 is an example of the waveforms involved in the multipath simulation process.

Now referring to FIG. 3, the frequency modulation on vector A is shown by waveform D and can be represented by $\omega_A(t)$. Likewise, the frequency modulation on vector B is shown by waveform E and can be represented by $\omega_B(t)$. For a filtered PCM (Pulse Code Modulation) baseband signal, FIG. 3 shows the time delay $\tau$ between the modulation on the Direct (D) and indirect (E) signals. The polarity of the difference frequency represented by $\Delta\omega(t)$ reverses from transition to transition as shown by the waveform designated (D-E). Defining $\Delta\omega(t)$ as the frequency of the direct path signal minus the frequency of the indirect path signal we have:

$$\Delta\omega(t) = \omega_A(t) - \omega_B(t) \quad (2)$$

The phase difference $\Phi(t)$ between the B and A vectors relative to $\Phi_o$ is obtained by integration of the frequency difference.

$$\Phi(t) = \int \Delta\omega(t)dt \quad (3)$$

This function is shown by the waveform designated $\int$ (D-E)$dt$. When $\omega_B(t)$ is greater than $\omega_A(t)$, the phase of the B vector $\Phi(t)$ will advance relative to A and vice versa. The phase of B will therefore swing back and forth relative to A with a mean value of $\Phi_o$. The maximum distortion occurs when the B vector is anti-parallel to the A vector and B is comparable in magnitude to A. To simulate a multipath signal, it is necessary to have two coherent RF signals with identical modulation except that the modulation on one signal is delayed by $\tau$ seconds. The delay $\tau$ should be continuously adjustable from zero to the limit of interest.

This effect can thus be simulated by modifying the frequency modulation (a frequency modulated RF carrier will be assumed for this description) on the indirect path in accordance with the function (D-E). This is seen by recognizing that the modulated function E of FIG. 3 may be obtained by subtracting the function (D-E) from (D). A video signal of the form (D-E) can be obtained by delaying the baseband signal D and subtracting it from the undelayed waveform D. This signal can in turn be used to modify the frequency modulation on the indirect path. The result is an accurate simulation of the effects arising from delay of the RF signal without the inherent problems in actually delaying the RF signal. When the direct signal and indirect signal are linearly summed, the resultant signal is identical to the received multipath signal. This resultant signal C is illustrated in the vector diagram of FIG. 2. The angle $\Phi_o$ is the average phase of angle B relative to A and $\Phi$ is the instantaneous phase of B relative to $\Phi_o$.

Figure 4A:
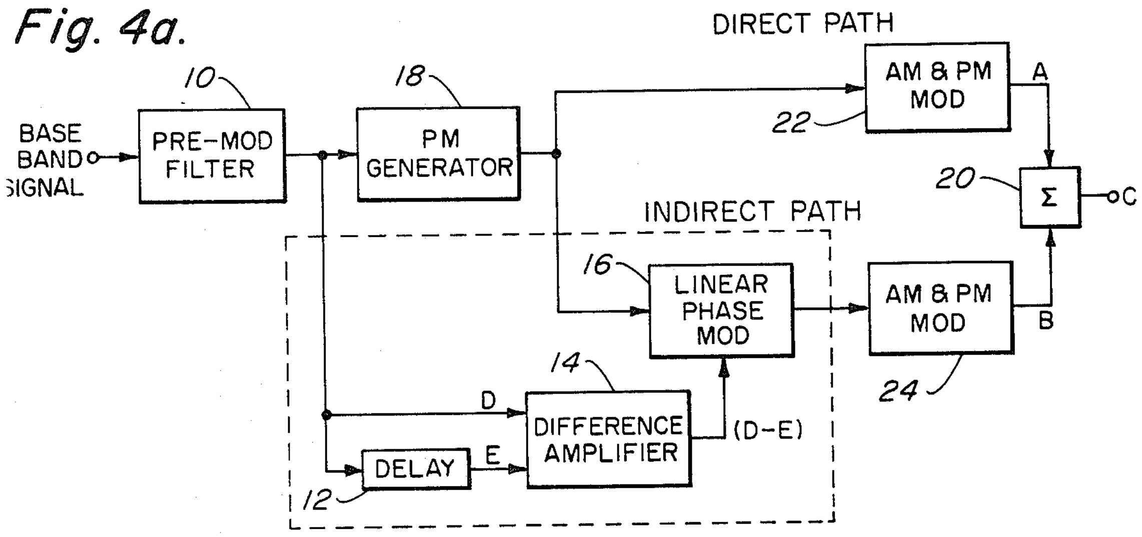
FIG. 4*a* illustrates multipath simulator for phase modulated signals.

Turning now to FIG. 4*a*, one implementation of the simulator is shown for the case of a phase modulated RF carrier. The input baseband signal is shown passing through a pre-modulation filter 10 which is included to provide the usual source of band limiting. The circuitry which has been added to simulate the multipath effects arising from modulation on the RF carrier are enclosed in dashed lines. This circuitry consists of a baseband delay device 12, difference amplifier 14 and a linear phase modulator 16. The phase modulator 16 also appears in the conventional multipath simulator, however, it would not be modulated with a signal derived from the baseband signal and is not usually required to be linear. For this reason the linear phase modulator 16 is shown as a part of the added circuitry relevant to this invention. The symbols (D, E, D-E) appearing in the figure are used to identify the points where the typical signals identified by the same symbols in FIG. 3 would appear.

The phase modulation appearing on the direct path signal is produced by PM generator 18 and will be identical to waveform D. This will also be the modulation on the indirect path signal up to the linear phase modulator 16. The linear phase modulator 16 is excited by waveform (D-E) which modifies the phase modulation on the indirect path signal such that it takes the form E in FIG. 3. Thus, signal B appears as a delayed replica of signal A simulating an indirect path signal as shown in FIG. 1. The two signals are then fed to linear summer 20 which produces a resultant C identical to the received multipath signal.

Figure 4B:
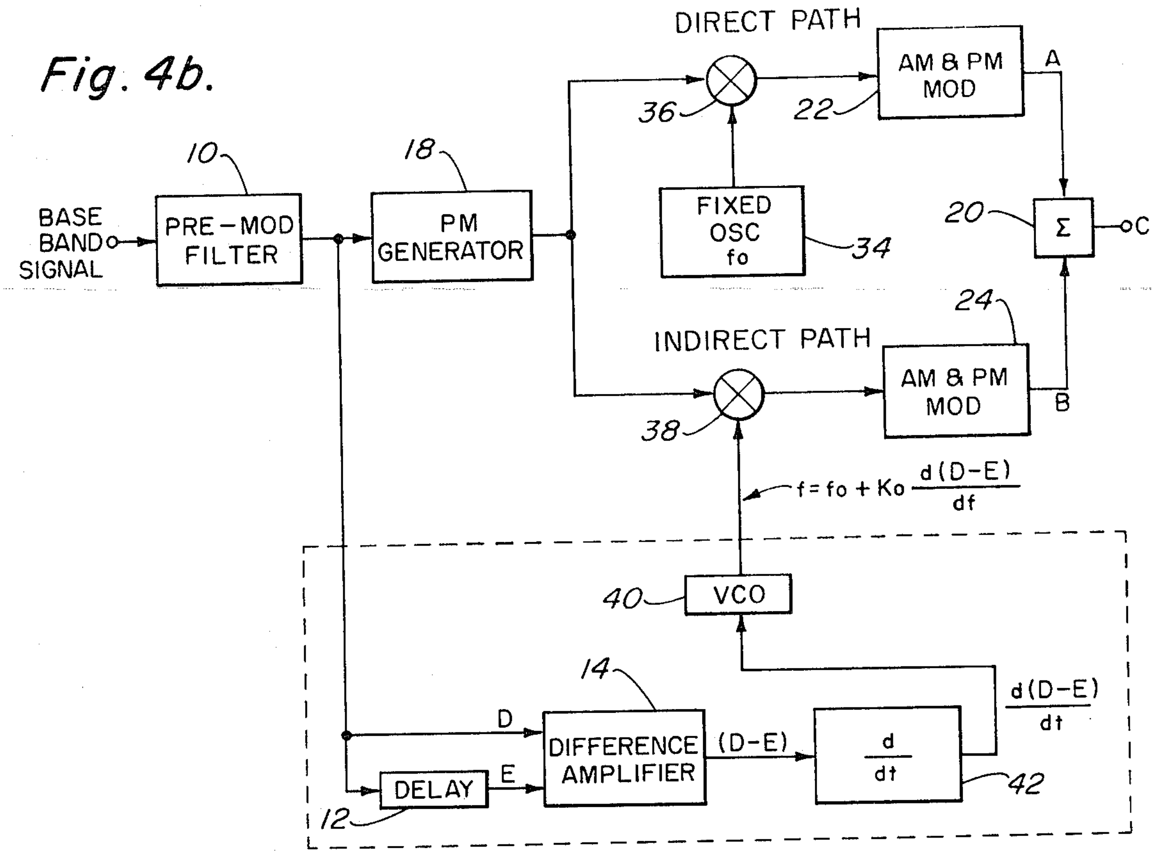
FIG. 4*b* illustrates an alternate configuration for the phase modulated multipath simulator of FIG. 4*a*.
Figure 4C:
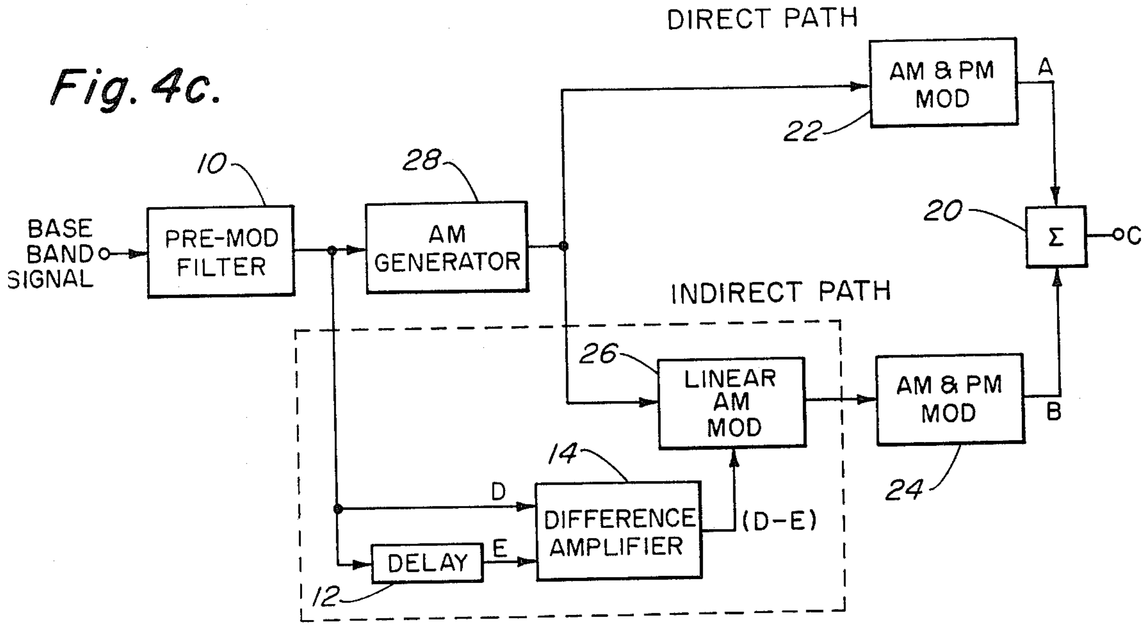
FIG. 4*c* illustrates a multipath simulator for amplitude modulated signals.

For the case of an amplitude modulated RF carrier, two modifications of the circuit shown in FIG. 4*a* are necessary as shown in FIG. 4*c*. Linear phase modulator 16 has been replaced with a linear AM modulator 26 and the PM generator 18 has been replaced with an AM generator 28. Otherwise, the circuit is the same and functions in the same manner. Also, additional amplitude and phase modulators can be added as shown in 22 and 24, as desired. For many applications manual control may be all that is required here.

Figure 5A:
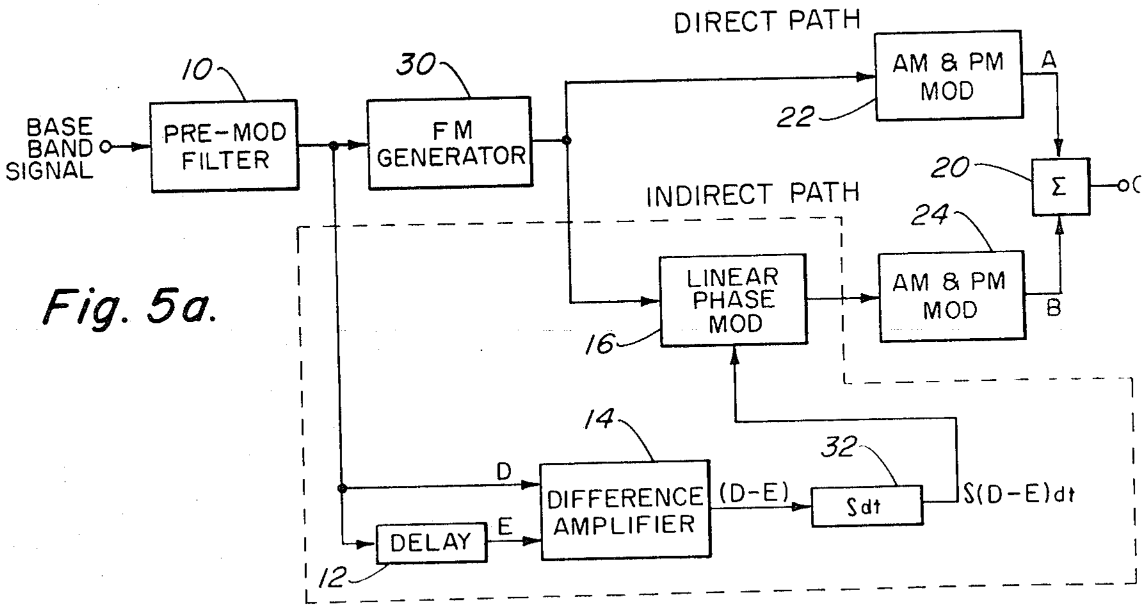
FIG. 5*a* illustrates a multipath simulator for frequency modulated signals.

FIG. 5*a* shows an implementation for a frequency modulated (FM) carrier which employs linear phase modulator 16. Note that the construction is similar to that of FIG. 4*a* except the difference being that the PM generator 18 has been replaced by an FM generator 30 and an integrator 32 has been inserted between the difference amplifier 14 and the linear phase modulator 16. This is in accordance with equation (3) above and the discussion pertaining thereto. The output of the integrator is the waveform of FIG. 3 labeled $\int$ (D-E)$dt$ which represents the integral of the difference frequency.

Figure 5B:
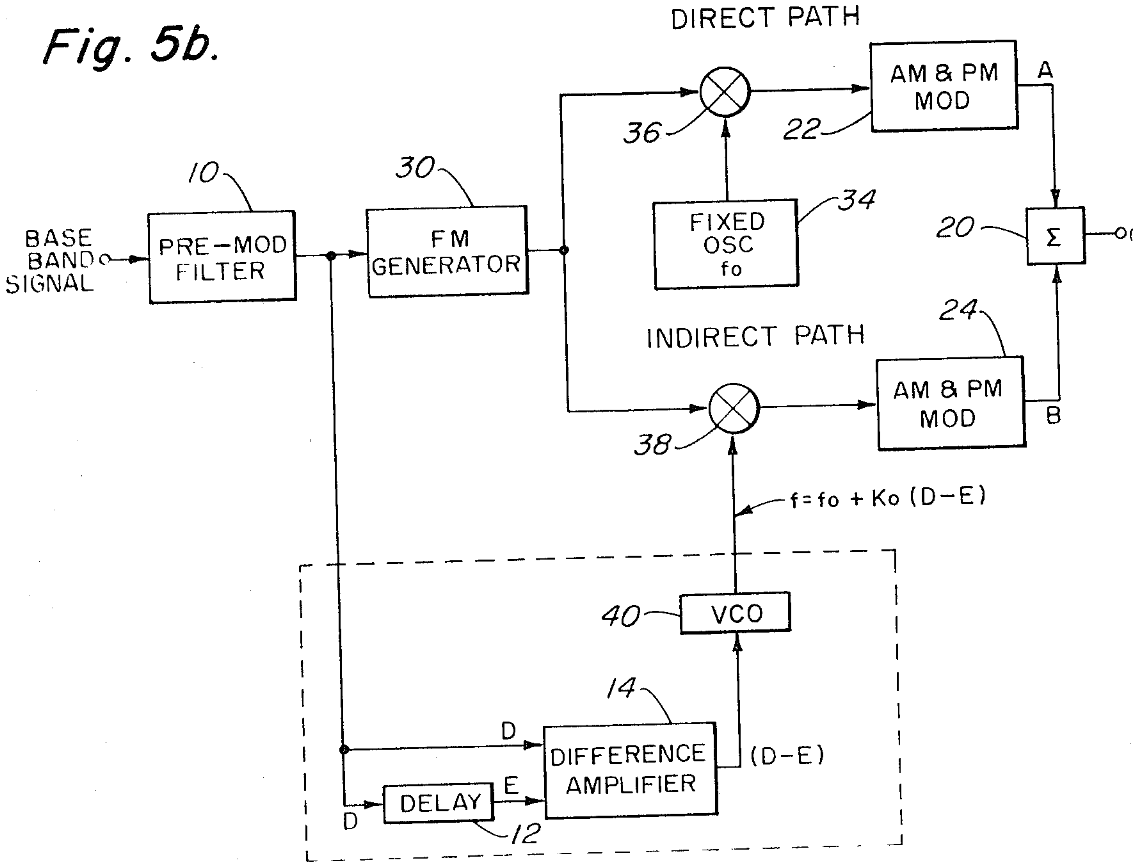
FIG. 5*b* shows an alternate configuration for the frequency modulated multipath simulator of FIG. 5*a*.

An alternate construction for the FM carrier is shown in FIG. 5*b*. This construction combines the implementation of this invention with frequency translation. An additional advantage of this circuit is the elimination of the linear phase modulator 16 with its inherent difficulty of achieving linearity. Here, a voltage controlled oscillator (VCO), 40 follows the difference amplifier and provides the function of local oscillator as well as providing the means of modifying the modulation on the indirect path signal. The VCO drives frequency translator (mixer) 38 in the indirect path while fixed oscillator 34 drives frequency translator (mixer) 36 in the direct path. If desired, the unmodulated frequency (*fo*) of the VCO, 40 can be phase locked to the fixed oscillator 34. This is possible because the mean value of waveform (D-E) is zero. The sum frequencies are also present in the outputs of the mixers, however, these are rejected by the pre-selector of the FM receiver. Alternatively, side band reject filters (not shown) could be inserted in the direct and indirect paths after mixers 36 and 38. The frequency translation feature adds to the flexibility of the simulator by permitting the output to be set to any desired value by adjusting the center frequency of the FM generator. The fixed oscillator 34 and VCO, 40 can operate at any convenient frequency which need never be changed.

FIG. 4b shows the implementation of frequency translation for the case of a phase modulated RF carrier. However, differentiator 42 has to be inserted between difference amplifier 14 and VCO, 40. The output of differentiator 42 is labeled $d(\text{D-E})/dt$ and is shown in FIG. 3.

In both FIGS. 4*b* and 5*b* the output of the VCO, 40 is labeled as a combination of the unmodulated signal ($f_o$) plus a constant ($K_o$) times the signal with which the VCO, 40 is modulated. The constant ($K_o$) is the sensitivity of VCO, 40 which in this case is identical to the sensitivity of the FM or PM generator. When combined in multiplier 38, the correct form of the indirect path signal is produced.

Figure 6:
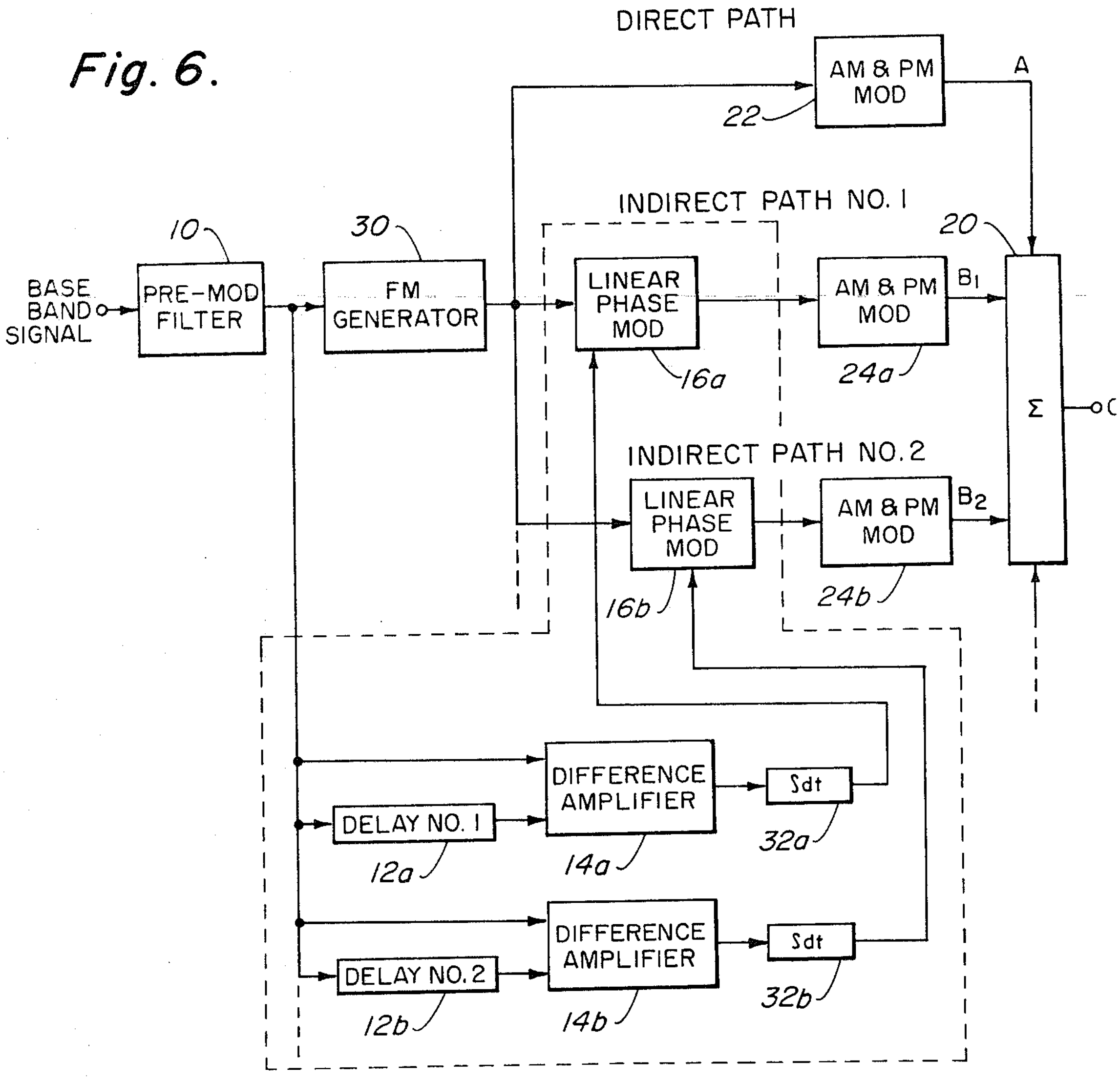
FIG. 6 shows an example of multipath simulation of more than one indirect path.

The idea of this invention can easily be expanded to simulate the effects arising from more than one indirect path. This is shown in FIG. 6 which is an expansion of the single indirect path configuration shown in FIG. 5*a.* It is seen that this expansion requires simply a duplication of circuitry existing in the single indirect path configuration for each additional indirect path simulated. The only difference being that the delay elements will be adjusted as desired for each indirect path.

Figure 7:
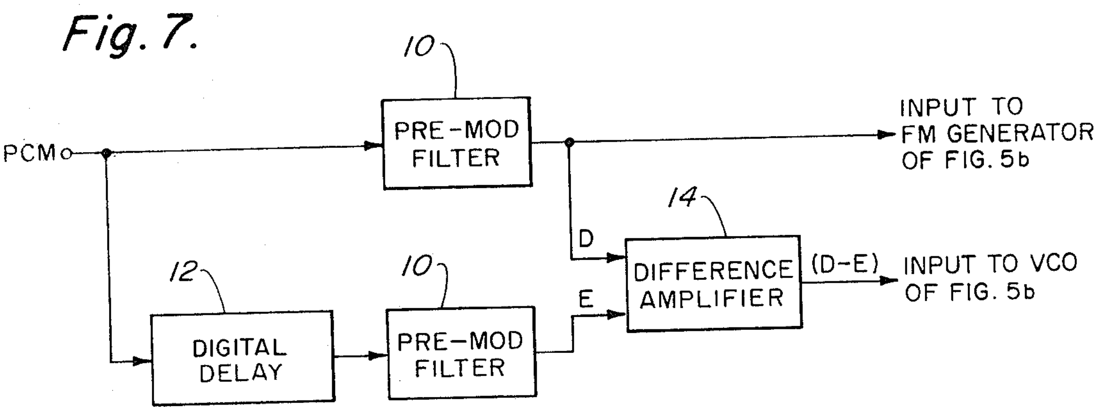
FIG. 7 shows a configuration using a digital delay for use with PCM input formats.

In the case of PCM baseband format, a single digital delay can be used in place of the analog delay indicated in FIGS. 4 through 6. This configuration requires two identical pre-modulation filters as shown in FIG. 7. The implementation of FIG. 7 applies to FIG. 5*b*, however, the idea is equally applicable to the other configurations. A digital delay device requires rectangular input signals of constant amplitude and produces at the output rectangular signals of constant amplitude with all transitions delayed an equal amount. This device will permit continuous variation of delay over a full bit period.

Figure 8:
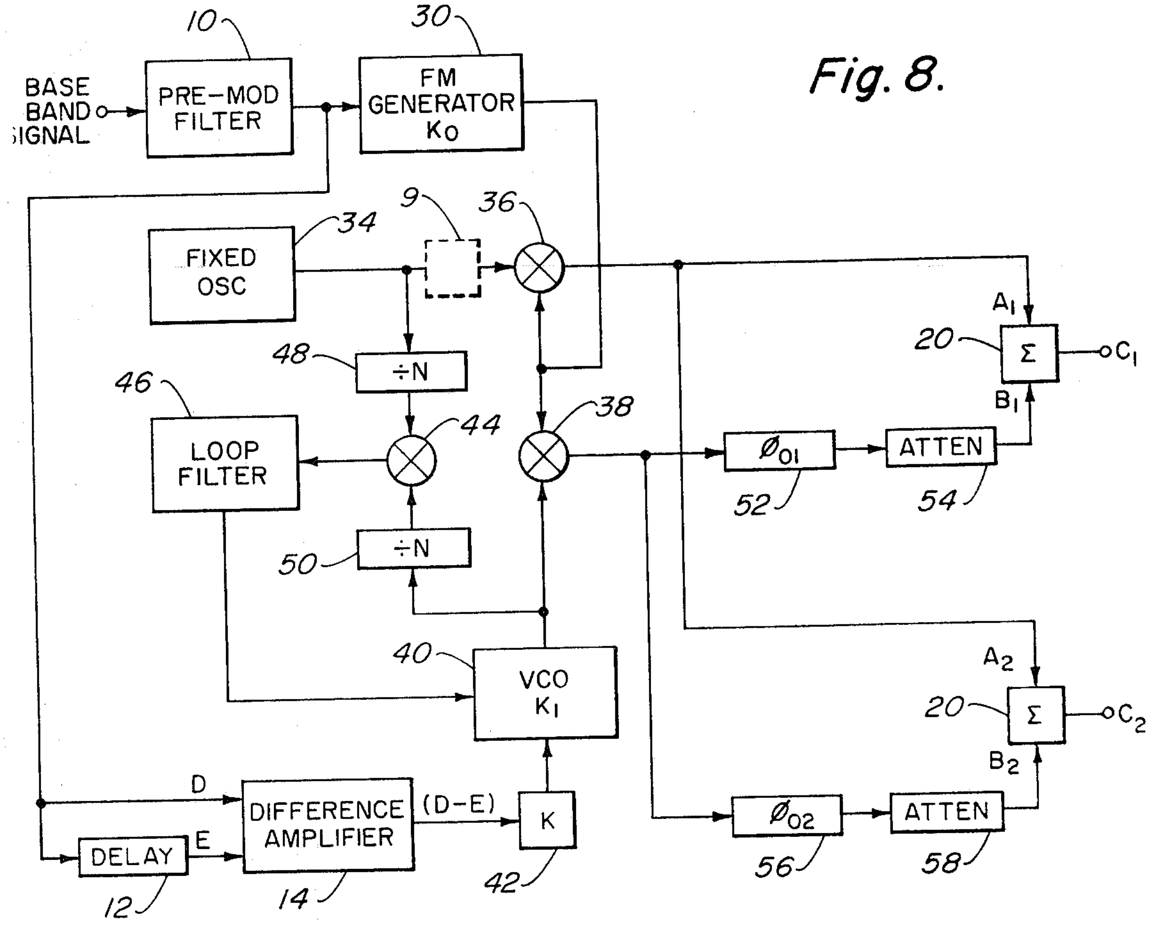
FIG. 8 illustrates a multipath simulator with a phase lock loop and a provision for polarization diversity signals.

In FIG. 8 another embodiment is shown with a phase lock loop and in which diversity signals are provided. In order to achieve coherence, it is necessary to phase lock the average frequency of the VCO to the average frequency of the fixed oscillator. In this circuit, the VCO is phase locked to a fixed frequency crystal oscillator 34 which is at least as stable as the FM generator. The frequencies of fixed oscillator 34 and VCO, 40 are each subtracted from the FM generator frequency in the frequency translators (mixers) 36 and 38. As before the sum frequencies are rejected by the FM receiver. In this case, the sensitivity of the VCO ($K_1$) is not assumed to be equal to that of the FM generator sensitivity $K_o$; thus a gain factor 42 is introduced to compensate and is adjustable to make the gain product $KK_1$ equal to $K_o$.

Figure 2:
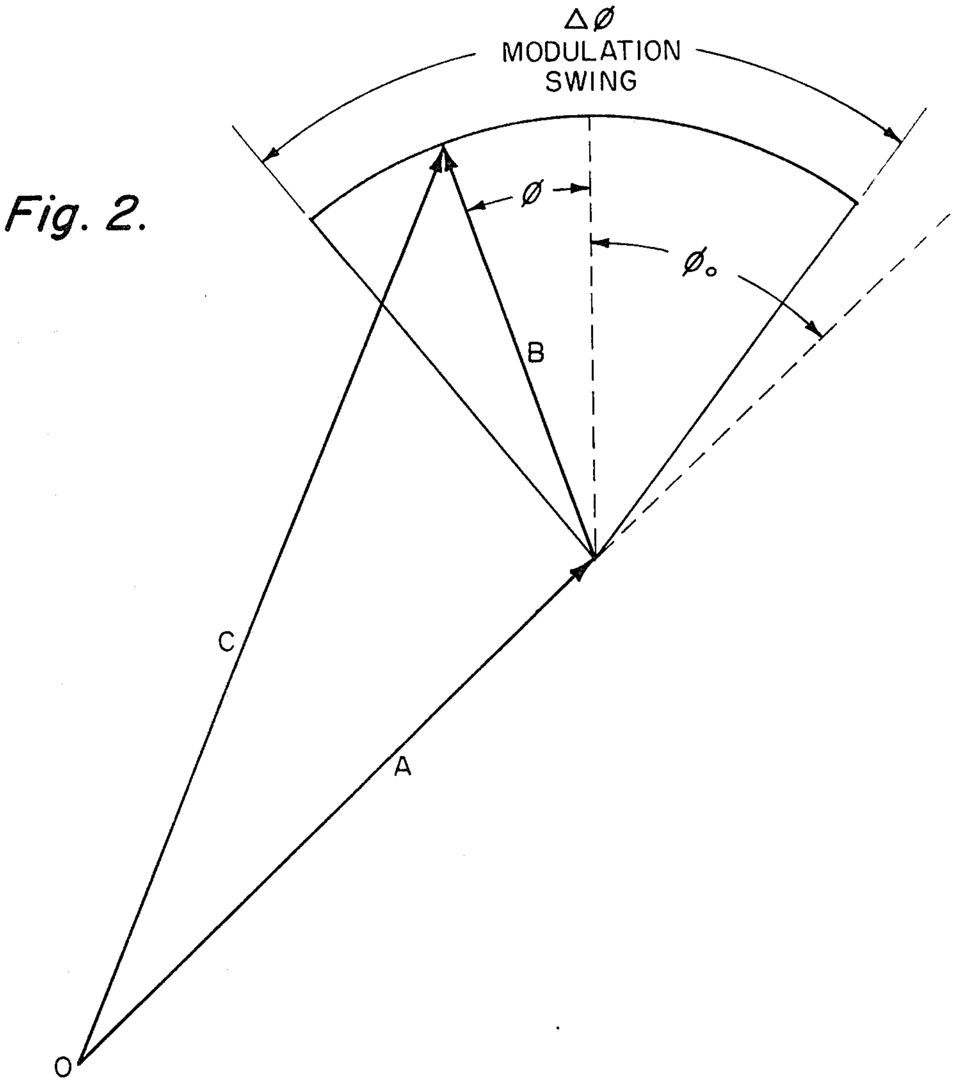
FIG. 2 is a vector diagram for the simple multipath condition of FIG. 1.

Phase locking is provided by feeding the outputs of the VCO, 40 and fixed oscillator 34 to mixer 44 then feeding back the output through loop filter 46 to the VCO, 40. Divide by N scalers 48 and 50 have been added to increase the maximum allowable peak to peak modulation swing $\Delta\ \Phi$ (FIG. 2). This can be determined from equation (3) and for PCM (NRZ) is given by:

$$\Delta\ \Phi = 2\Delta\ \omega\tau \qquad (4)$$

for a pre-modulation filter without overshoot where $\Delta\ \omega$ is the deviation of the FM generator ($(\Delta\ )\ \omega = 2\pi\Delta f$). Equation (4) is independent of the pre-modulation filter 10, bandwidth. For $\Delta f$ equal to 125 KHz, $\Delta\ \Phi$ would be 90° per microsecond of delay $\tau$. In the present circuit N is 16.

A phase shifter 52 and attenuator 54 in the indirect path permits $\Phi_o$ and the magnitude of B to be set to desired values. This is one way of providing the AM and PM modulation, 22 and 24 shown throughout FIGS. 4 to 6. Other types of modulation may be used in either one or in both of the paths of signals A and B. To simulate realistic polarization diversity signals, different values of $\Phi_o$ and different relative magnitudes of A and B vectors are provided by the additional phase shifter 56 and attenuator 58.

Differential doppler is caused by motions of the receiver and transmitter which result in changes in the differential time delay $\tau$. This causes the average phase angle $\Phi_o$ between the A and B vectors to change.

Differential doppler could be simulated in the circuit of FIG. 8 by disabling the phase lock loop and controlling the average frequency of VCO, 40 with an external voltage source. This approach would result in very poor stability and control because of the relatively high frequency (30 MHz) at which the VCO must operate.

Figure 9:
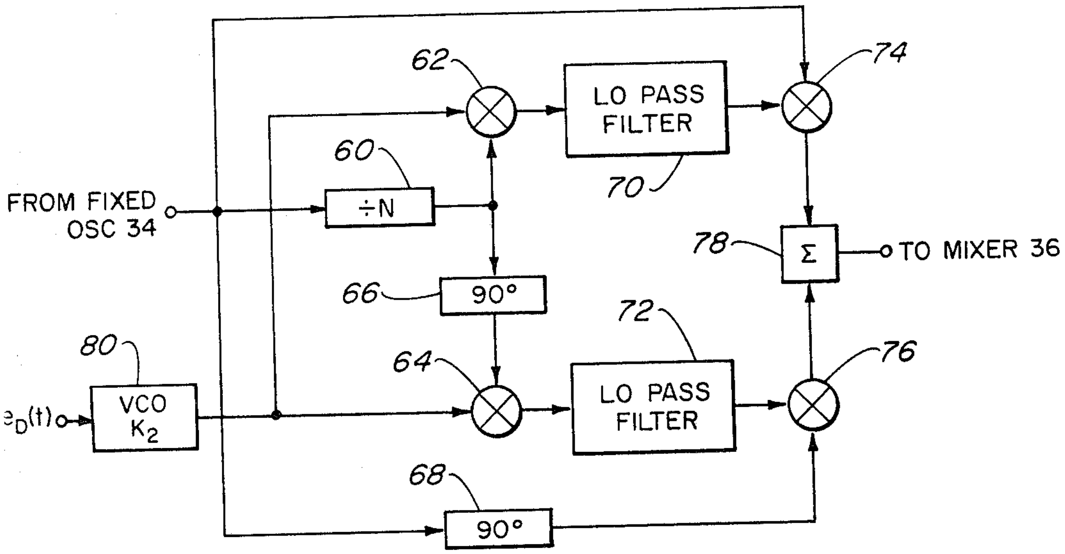
FIG. 9 shows a modification of the circuit of FIG. 8 to provide differential doppler simulation.

However, the phase shift method of single side band (SSB) generation shown in FIG. 9 provides a good technique for simulating differential doppler in the circuit of FIG. 8. The differential doppler frequency sould be introduced in either the direct or indirect path of FIG. 8, however, the best location is in the fixed oscillator line between the junction for divider 48 and the mixer 36 as shown by dotted box 9. The SSB technique requires a fixed reference oscillator and fixed oscillator 34 can also serve this function provided that its frequency is properly divided down.

A differential doppler simulator based on the above ideas is shown in FIG. 9. The unmodulated frequency of VCO, 80 is set to the frequency of fixed oscillator 34 as divided down by divider 60. A differential doppler control signal $e_D(t)$ is inserted into VCO, 80.

The output of VCO, 80 and divided down fixed oscillator frequency are fed to mixers 62 and 64. The output of fixed oscillator is shifted 90° by phase shifters, 66 (after being divided down) and 68. Low pass filters 70 and 72 are necessary to reject the sum frequencies. The difference frequencies are combined again in mixers 74 and 76 with fixed oscillator 34 frequency and then fed to summer 78.

The final output frequency is the fixed oscillator frequency offset by the differential doppler frequency. Also, since the differential doppler frequency is obviously directly proportional to the differential doppler control signal $e_D(t)$, any desired differential doppler function can be directly inserted.

Obviously, many modifications and variations of the present invention are possible in the light of the above teachings. It is therefore to be understood that within the scope of the appended claims the invention may be practiced otherwise than as specifically described.

What is claimed is:

1. A circuit for simulating the effects of multipath as baseband frequencies comprising:

means for filtering the baseband signal prior to modulation;

means for generating a carrier signal;

means for modulating the carrier signal with the output of said filtering means;

means for splitting the output of the modulating means into a direct path signal and at least one indirect path signal;

means for modifying the modulation on the indirect path signal to produce a delayed replica of the direct path signal; and means for summing the direct path signal and the indirect path signal to produce the multipath signal.

2. The circuit of claim 1 wherein said means for modifying the modulation on the indirect path signal comprises:

a linear modulator inserted in the indirect signal path;

means connected to the filtering means for splitting the baseband signal into first and second originals;

means for delaying the second signal;

means for producing a difference signal by subtracting the delayed signal from said first signal; and means for applying said difference signal to said linear modulator.

3. The circuit of claim 2 wherein said linear modulator is a linear phase modulator.

4. The circuit of claim 3 wherein said carrier signal generating means is a PM generator.

5. The circuit of claim 3 wherein said carrier signal generating means is a FM generator; and said means for applying said difference signal to said linear phase modulator is an integrator.

6. The circuit of claim 2 wherein:

said linear modulating means is a linear AM modulator; and said carrier signal generating means is an AM generator.

7. The circuit of claim 1 including:

means for splitting the output of the modulating means into a plurality of indirect path signals;

a plurality of means for modifying the modulation on each indirect path signal to produce different delayed replica of the direct path signal from each indirect path signal; and said summing means includes means for summing the plurality of indirect signals with the direct path signal to produce a multipath signal.

8. The circuit of claim 2 wherein:

said second signal is derived from the input to said filtering means;

said delaying means is a digital delay;

second filtering means are inserted between said digital delay; and said means for producing a difference signal.

9. The circuit of claim 1 further comprising:

a first frequency mixing means inserted into the direct path signal;

a fixed frequency oscillator connected to the first frequency mixer;

said means for modulating the indirect path signal comprises;

a second frequency mixing means inserted into the indirect path signal;

means connected to the filtering means for splitting the base-band signal into first and second signals;

means for delaying the second signal;

means for producing a difference signal by subtracting the delayed signal from the first signal; and means for applying the difference signal to said second frequency mixing means.

10. The circuit of claim 9 wherein said carrier signal generating means is a FM generator; and said means for applying the difference signal to said second frequency mixer is a voltage controlled oscillator.

11. The circuit of claim 9 wherein said carrier signal generating means is a PM generator; and said means for applying the difference signal to said second frequency multiplier comprises a differentiator and a voltage controlled oscillator.

12. The circuit of claim 9 including:

a voltage controlled oscillator as the means for applying the difference signal to the second frequency multiplier; and means for phase locking the voltage controlled oscillator to the frequency of the fixed frequency oscillator.

13. The circuit of claim 12 wherein said phase locking means comprises:

a frequency mixer connected to the outputs of the voltage controlled oscillator and the fixed frequency oscillator;

a pair of frequency dividers are provided between the outputs of the voltage controlled oscillator and fixed frequency oscillator respectively; and a loop filter is connected between the output of the frequency mixer and an input of the voltage controlled oscillator.

14. The circuit of claim 13 including means for inserting a differential doppler simulating signal.

15. The circuit of claim 14 wherein said differential doppler simulating means is inserted between the fixed frequency oscillator and said first frequency mixer.

16. The circuit of claim 13 including means for simulating polarization diversity signals.

* * * * *

UNITED STATES PATENT OFFICE

CERTIFICATE OF CORRECTION

Patent No. 3,761,825 Dated 25 September 1973

Inventor(s) Eugene R. Hill

It is certified that error appears in the above-identified patent and that said Letters Patent are hereby corrected as shown below:

Column 6, line 35, "sould" should read --could--
Column 7, line 1, "as" should read --at--
line 22, "originals" should read --signals--
line 54, after "delay;" insert --and--
line 55, "are" should read --is--
Column 8, line 1, after "delay" delete --; and--
line 2, before "said" insert --and--

Signed and sealed this 2nd day of July 1974.

(SEAL)
Attest:

EDWARD M. FLETCHER, JR.
Attesting Officer

C. MARSHALL DANN
Commissioner of Patents